Figure 1:
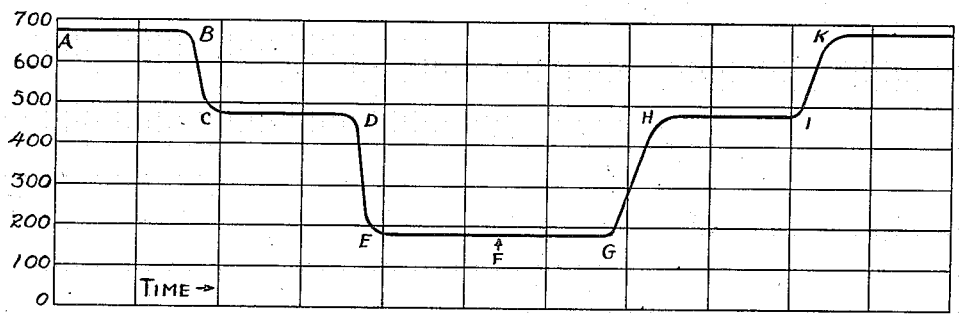

May 26, 1936. F. R. BICHOWSKY 2,041,741
ABSORBENT FOR REFRIGERANTS
Original Filed Sept. 7, 1929

INVENTOR
Francis Russell Bichowsky
BY
Spencer Hardman & Fehr
ATTORNEY

Patented May 26, 1936

2,041,741

UNITED STATES PATENT OFFICE 2,041,741

ABSORBENT FOR REFRIGERANTS

Francis Russell Bichowsky, Washington, D. C., assignor, by mesne assignments, to General Motors Corporation, a corporation of Delaware Application September 7, 1929, Serial No. 390,988
Renewed June 5, 1934

1 Claim. (Cl. 62—179)

This invention relates to absorbents for refrigerants.

One of the objects of this invention is to provide a solid absorbent or reactant material in combination with a suitable refrigerant which may be operated at temperatures attainable with ordinary atmospheric conditions to produce temperatures suitable for refrigeration purposes.

Further objects and advantages of the present invention will be apparent from the following description, reference being had to the accompanying drawing.

Figure 2:
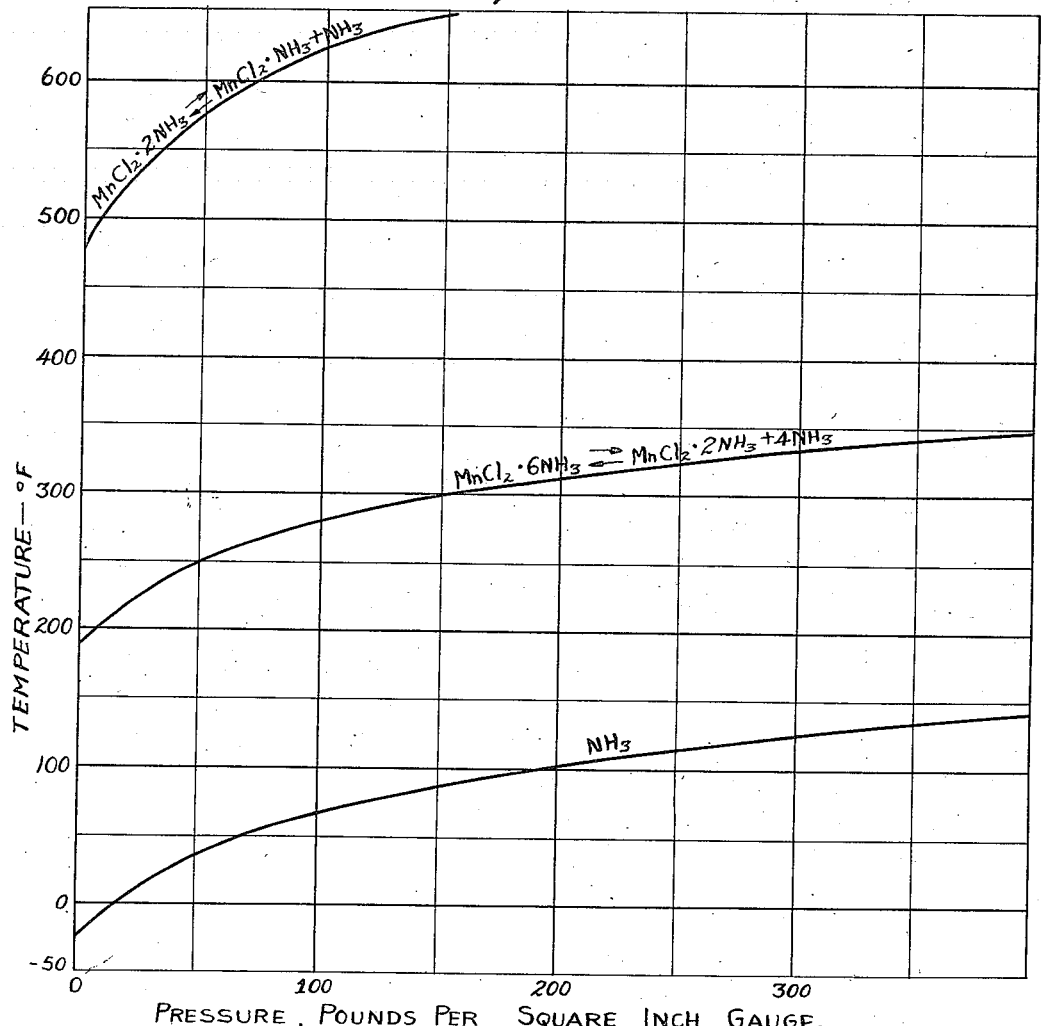

In the drawing:

Figure 1 is a constant pressure cooling and heating curve, showing the temperatures of a representative reactant material in absorbing and liberating a representative refrigerant; and Figure 2 is a graph showing the vapor pressure characteristics of a representative refrigerant and of a representative absorbent.

In refrigerating apparatus of the absorption type use is made of a reactant material, which upon being cooled absorbs or takes up a refrigerant vapor at a low pressure to permit evaporation of refrigerant at a low temperature and thus produce refrigeration. Thereafter the reactant material is heated to drive off or emit its absorbed refrigerant at a high pressure which permits the condensation of the refrigerant. It is desirable to use a solid reactant material because this type of material permits the formation of a permanent, stable, porous structure through which the refrigerant readily permeates, and because the use of a solid reactant eliminates the objectionable feature of liquid reactants, namely, distilling from the solution with the refrigerant.

While absorption refrigerating machines using solid reactants have heretofore been known, it is necessary to cool these machines with water because the temperature to which the reactant must be cooled in order to take up refrigerant at a sufficiently low pressure is too low to be accomplished by air cooling. In consequence these machines are of the nature of more or less permanent installations which require water supply and waste connections. These objections seriously limit the portability of refrigerating machines and curtail their utility, as well as increase their operating cost.

My invention is concerned with providing absorbents of the solid reactant type which can be readily cooled by air. By using such an absorbent the refrigerating machines become readily portable, have large refrigerating capacity for a unit of given size, and are economical to operate.

Since air temperatures of 100 to 110° F. will be encountered, apparatus must be provided which will dissipate to the atmosphere at this temperature the heat absorbed from the space to be refrigerated. Since solid reactants are poor conductors of heat, in an apparatus of this type a temperature differential of 30 to 40° F. is required to produce satisfactorily rapid heat flow from the reactant material to the outside air, this means that the reactant material, when cooled to 140 or 150° F. must absorb the refrigerant at a sufficiently low refrigerant pressure to permit the change of phase state of the refrigerant in the refrigerating element at temperatures low enough to produce satisfactory refrigeration. Such temperatures must ordinarily be in the neighborhood of 25° F. or lower in order to freeze ice at a satisfactory rate. On the other hand when the reactant is being heated, it must emit refrigerant vapor at a sufficiently high pressure to permit the refrigerant to change its phase state in an air-cooled heat exchanger. In the illustration of the invention herein adopted, this means that the reactant must give off refrigerant vapor which can change its phase state (liquefy) in an air-cooled condenser. The temperature differential which is required to remove heat from metal conduit in which gaseous refrigerant is flowing is less than that required to remove heat from solid reactant material. The temperature differential required for condensation may be, for example, 20° F. This requires the reactant to emit refrigerant at a refrigerant pressure which will permit condensation at approximately 120° F. Obviously the temperature at which such emission takes place must be within reasonable limits which can readily be obtained in household appliances, for example 500° F.

In addition to the temperature conditions which the reactant material must meet the material must be stable throughout the range of operation of the refrigerating apparatus. That is, at the temperatures encountered, while the substances may change their chemical and physical form during different periods of operation, they must be capable of returning to their original physical and chemical condition in order that the refrigerating cycle may be repeated, and must not react with each other or with the materials of which the apparatus is constructed to form chemical compounds other than the refrigerant and reactant.

As refrigerant, I prefer to use ammonia.

In order to provide suitable materials which can be used as reactants in air-cooled refrigerating machines, I have investigated the properties of a large number of chemical compounds and I find that there are a number of compounds which have a chemical affinity for ammonia and possess the property of uniting with the ammonia to form other chemical compounds known as addition compounds, ammines or ammoniates, in which each molecule of the substance holds in chemical combination one or a number of molecules of ammonia. Usually each substance mentioned is capable of combining with different numbers of molecules of the refrigerant so as to form several different addition compounds, which latter are described as of low order or high order according to whether there is a small or large number of molecules of refrigerant held in combination with each molecule of the substance. The lower order addition compounds will, under suitable conditions, absorb or combine with refrigerant to form higher order addition compounds, and thus produce refrigeration. The process is completely reversible, so that the higher order addition compounds can be dissociated into lower order addition compounds and free refrigerant which latter can be liquefied to be used again.

I have found that the following substances form addition products as described, with the refrigerant mentioned:

heat evolved by chemical combination the two substances will combine at a constant temperature to form an addition compound of the first order, namely manganese chloride-1 ammine, of the formula $MnCl_2.NH_3$. The temperature will remain constant as shown by the portion AB of the curve as long as the heat is removed and there are $MnCl_2$ and $NH_3$ to combine. After the chemical combination is complete further cooling will reduce the temperature as indicated by the portion BC of the curve until at a temperature of approximately 485° F. the $MnCl_2.NH_3$ again combines with ammonia, forming manganese chloride-2 ammine, $MnCl_2.2NH_3$, which is an addition product of the second order. As long as the manganese chloride-1 ammine is being converted into manganese chloride-2 ammine the temperature will remain constant at 485° as shown by the portion CD of the curve. After

| | | | | |
|---|---|---|---|---|
| AgBr | $Cd(C_6H_5CO_2)_2$ | $Co(C_{10}H_7SO_3)_2$ | $CuS_2O_6$ | |
| AgCl | | $Co(CH_3CO_2)_2$ | $CuS_4O_6$ | |
| AgI | $Cd(C_{10}H_7SO_3)_2$ | | | |
| $AgBrO_3$ | | $Co(C_6H_5CO_2)_2$ | $Cu(CH_3CO_2)_2$ | |
| $AgNO_2$ | $Cd(ClO_3)_2$ | $CrCl_3$ | $Cu(HCO_3)_2$ | |
| $AgNO_3$ | | $CuBr$ | | |
| $AlBr_3$ | $Cd(IO_3)_2$ | $CuCl$ | $Cu(HCO_2)_2$ | |
| $AlCl_3$ | | $CuI$ | | |
| $AlI_3$ | $CeCl_3$ | $CuBr_2$ | $CuC_2O_4$ | |
| Ba (metal) | $CoBr_2$ | $CuCl_2$ | | |
| $BaCl_2$ | $CoCl_2$ | $CuI_2$ | $Cu(C_6H_5CO_2)_2$ | |
| $BaI_2$ | $CoI_2$ | $CuSO_4$ | | |
| $BaBr_2$ | $Co(ClO_4)_2$ | | Cu.naphthyl benzoate | |
| Ca (metal) | $Co(NO_3)_2$ | $Cu(ClO_3)_2$ | $Cu(C_{10}H_7SO_3)_2$ | |
| $CaBr_2$ | | | | |
| $CaCl_2$ | $Co(H_2PO_2)_2$ | $Cu(ClO_4)_2$ | $FeBr_2$ | |
| $CaI_2$ | $CoSO_4$ | | $FeCl_2$ | |
| $CdBr_2$ | $CoS_2O_6$ | $Cu(NO_3)_2$ | $FeI_2$ | |
| $CdCl_2$ | | | $FeSO_4$ | |
| $CdI_2$ | $Co(HCO_2)_2$ | $Cu(IO_3)_2$ | | |
| $CdSO_4$ | | | | |

| | | | | |
|---|---|---|---|---|
| $Fe(C_6H_5CO_2)_2$ | $Mn(C_6H_5CO_2)_2$ | $NiS_2O_3$ | $SnBr_2$ | $Zn(CH_3CO_2)_2$ |
| $Fe(C_{10}H_7SO_3)_2$ | $NH_4Br$ | $NiS_4O_6$ | $SnCl_2$ | $Zn(HCO_3)_2$ |
| | | | $SnI_2$ | |
| $FeCl_3$ | $NH_4Cl$ | $NiMoO_4$ | $SrBr_2$ | $ZnC_2O_4$ |
| $FeCl_3.2KCl$ | | $NiWO_4$ | $SrCl_2$ | |
| | $NH_4I$ | | $SrI_2$ | |
| $Fe_2(SO_4)_3$ | | $NiSeO_4$ | Sr(metal) | $Zn(C_6H_5CO_2)_2$ |
| | $NH_4NO_3$ | | $ThCl_4$ | |
| | | $Ni(H_2PO_2)_2$ | $TlCl_3$ | Zn.naphthyl benzoate |
| HgCN | | | | |
| $K_2HgI_4$ | NaBr | $Ni(HCO_2)_2$ | $Tl_2(SO_4)_3$ | $ZnFe(NO)(CN)_5$ |
| LiBr | NaCl | | | |
| LiCl | NaI | $Ni(CH_3CO_2)_2$ | $ZnBr_2$ | Zn.naphthyl sulfonate |
| LiI | $NiBr_2$ | | $ZnCl_2$ | |
| $LiCO_3$ | $NiCl_2$ | $Ni(C_6H_5SO_3)_2$ | $ZnI_2$ | |
| $MgBr_2$ | $NiI_2$ | | $ZnSO_4$ | $ZnS_2O_6$ |
| $MgCl_2$ | $NiSO_4$ | $Ni(C_6H_5CO_2)_2$ | | |
| $MgI_2$ | | | $Zn(NO_2)_2$ | |
| $MnBr_2$ | $Ni(SCN)_2$ | Ni.naphthyl sulfonate | $Zn(NO_3)_2$ | |
| $MnCl_2$ | $NiS_2O_6$ | Ni.naphthyl benzoate | | |
| $MnI_2$ | | | $ZnS_2O_3$ | |
| $MnSO_4$ | $Ni(ClO_3)_2$ | $PbBr_2$ | | |
| | $Ni(ClO_4)_2$ | $PbCl_2$ | $ZnS_4O_6$ | |
| | | $PbI_2$ | | |
| | $Ni(NO_2)_2$ | $PdCl_2$ | $ZnSO_3$ | |
| | | $PdI_2$ | | |
| | $Ni(NO_3)_2$ | $PtCl_4$ | $Zn(CNS)_2$ | |
| | | $PtI_4$ | | |
| | $Ni(IO_3)_2$ | | $Zn(ClO_3)_2$ | |
| | | | $Zn(ClO_4)_2$ | |

These substances as well as their various addition products are suitable for use as reactants in combination with ammonia as a refrigerant.

As an example of the substances listed consider manganese chloride. This has the property of combining with the ammonia to form a variety of addition compounds. Fig. 1 shows the behavior of manganese chloride and its addition products with ammonia at various temperatures and at a pressure of one atmosphere. At a temperature of approximately 675° F. manganese chloride and gaseous ammonia are in equilibrium with each other. If the $MnCl_2$ is cooled to remove the latent this combination is complete, further cooling will reduce the temperatures of the mass of material as shown by the portion DE until at the temperature of approximately 185° F. the manganese chloride-2 ammine will again take up ammonia forming manganese chloride-6 ammine $$MnCl_2.6NH_3,$$

an addition product of the sixth order. This occurs at a constant temperature as indicated by EF of the curve. Any of the addition products mentioned may be dissociated into gaseous ammonia and the addition products of the next lower order by supplying the heat of dissociation at the temperature of equilibrium. Suppose the direction of heat flow is reversed at the point F, and thereafter heat is supplied to the material. Then a molecule of manganese chloride-6 ammine at a temperature of approximately 185° F. dissociates into a molecule of manganese chloride-2 ammine and 4 molecules of gaseous ammonia. This dissociation occurs at a constant temperature as shown by the portion FG of the curve. When dissociation is complete, heating the material will increase its temperature as shown by the portion GH of the curve. At the temperature of 485° F. one molecule of manganese chloride-2 ammine breaks down into a molecule of manganese chloride-1 ammine and one molecule of ammonia. While this dissociation is taking place the temperature will remain constant and after dissociation is complete further heating will elevate the temperature as shown in the portion IK of the curve until at the temperature of 675° F. the last remaining molecule of ammonia will be evolved, the manganese chloride-1 ammine being converted into pure manganese chloride, $MnCl_2$.

Each of the addition products is a suitable reactant to be used with the refrigerant ammonia. The temperatures at which the described reactions occur are dependent upon the pressure. Fig. 2 shows the pressures and temperatures for equilibrium conditions between ammonia and the higher addition products of manganese chloride as well as the vapor pressure characteristics of ammonia.

From this figure it will be seen that at a pressure of approximately 40 pounds per square inch gauge, ammonia boils at a temperature of approximately 25° F. Likewise at the pressure of 40 lbs. Manganese chloride-6 ammine is in equilibrium with ammonia at a temperature of approximately 240° F. Consequently if manganese chloride, or any of its lower-order addition products is cooled at this temperature, ammonia will be absorbed to form $MnCl_2.6NH_3$. This will permit evaporation of the ammonia at a temperature of 25° F., thus producing useful refrigeration. The temperature of 240° F. is easily obtained in the absorber by means of suitable cooling means.

Likewise from Fig. 2 it will be seen that at a pressure of 260 lbs. ammonia will condense at a temperature of approximately 120° F. At the pressure of 260 lbs. manganese chloride-6 is in equilibrium with ammonia at temperature of 320° F. Consequently if the reactant is heated to this temperature gaseous ammonia will be evolved at a sufficiently high pressure to be condensed in a condenser cooled at 120°.

It will be observed that for each molecule of the reactant four molecules of ammonia are cyclically emitted and absorbed. The molecular volume of $MnCl_2$ is approximately twice that of ammonia, so that the product $MnCl_2.6NH_3$ may be said to have a unit molecular volume of 8 with reference to ammonia. Four molecules of ammonia being cycled, it will be evident that 50% of the volume of the saturated reactant is available refrigerant. This provides an absorbent of relatively large refrigerating capacity per unit volume.

The salts listed all behave in the same general way with the ammonia as does manganese chloride, the reactions taking place at differing temperatures and pressures and involving differing amounts of reactant and refrigerant. Manganese chloride and ammonia are explained merely for illustration of the reactions which occur, but it will be understood that the invention may be practiced with other reactants and/or refrigerants.

Some of the substances listed may be undesirable or unsuitable because of instability in the refrigerating cycle, or other reasons. However, of the compounds which I have examined, I find the following substances to be stable and suitable for my purpose because the compounds and/or some of their addition products when cooled to temperatures not less than 140° F. absorb satisfactory quantities of ammonia at pressures of 40 pounds gauge or less (and thus provide refrigerating temperatures of 25° F. or less) and that the addition products so formed, when heated to temperatures below 500° F. evolve the absorbed ammonia at a pressure of 260 pounds gauge or more, which permits the ammonia to be condensed at a temperature not less than 120° F.

The substances referred to are:

| | | | |
|---|---|---|---|
| $CaCl_2$ | LiBr | $NiSO_4$ | $CuCl_2$ |
| LiCl | $MnBr_2$ | $CdSO_4$ | $FeCl_3$ |
| $CdCl_2$ | $MgCl_2$ | $CdBr_2$ | $FeCl_2.2KCl$ |
| $CuSO_4$ | $FeSO_4$ | $AlCl_3$ | $Fe_2(SO_4)_3$ |
| $SrBr_2$ | Barium | $SrCl_2$ | HgCN |
| $FeCl_2$ | CuBr | AgBr | $K_2HgI_4$ |
| $PbI_2$ | $FeBr_2$ | AgCl | $NiMoO_4$ |
| $CoCl_2$ | $ZnSO_4$ | $BaBr_2$ | $NiWO_4$ |
| $MnSO_4$ | $ZnCl_2$ | Calcium | Strontium |
| $CaBr_2$ | $SnBr_2$ | $CeCl_3$ | $TlCl_3$ |
| $MnCl_2$ | $PbBr_4$ | $CoSO_4$ | $Tl_2(SO_4)_3$ |
| $CuCl_2$ | $Ni(SCN)_2$ | $CrCl_2$ | $Zn(CHS)_2$ |
| $ZnBr_2$ | | | |

Consequently any of these substances are adapted to be used as absorbents or reactants in air-cooled refrigerating apparatus wherein ammonia is used as the refrigerant.

The invention has been illustrated as applied to a refrigerating system in which refrigeration is produced by the evaporation of a liquid refrigerant. However, the invention is not limited to such systems, but is applicable to any system in which the phase state of the refrigerant is changed to absorb heat. For example, the invention may be applied to systems in which the refrigerant changes from a solid phase to a vapor phase in the refrigerating element.

Furthermore, the invention is not limited to any particular form of apparatus, nor to any specific materials, but embraces such apparatus and materials as fall within the scope of the following claim.

Throughout the specification and claims the temperatures referred to are in degrees Fahrenheit.

I claim:—

The process of refrigeration which comprises heating under pressure a higher ammonia addition compound of manganese bromide to change the compound into a lower addition compound for expelling ammonia vapor from the compound, cooling the ammonia vapor to a liquid and collecting the liquid, then lowering the pressure and cooling the compound to cause the liquid ammonia to evaporate and be absorbed by the compound to reform a higher ammonia addition compound.

FRANCIS RUSSELL BICHOWSKY.